3,374,204
PROCESS FOR PREPARING HIGH MOLECULAR WEIGHT POLYHYDROXY-POLYETHER RESINS

John E. Masters and Herbert P. Price, Louisville, Ky., assignors to Celanese Coatings Company, New York, N.Y., a corporation of Delaware
No Drawing. Continuation-in-part of application Ser. No. 281,356, May 17, 1963. This application Feb. 2, 1967, Ser. No. 613,426
5 Claims. (Cl. 260—47)

ABSTRACT OF THE DISCLOSURE

Soluble, fusible polymeric polyhydroxy-polyether resins prepared by reacting a mono(hydroxyaliphatic) monoglycidyl diether of a dihydric phenol with a boron trifluoride type catalyst.

CROSS-REFERENCE TO RELATED APPLICATIONS

This is a continuation-in-part of our copending application, Ser. No. 281,356, filed May 17, 1963, now abandoned.

BACKGROUND OF THE INVENTION

Polyhydroxy-polyether resins are well known compositions. Such compositions are prepared by reacting epichlorohydrin and dihydric phenols in various ratios with or without monofunctional modifiers. Such compositions and processes are described in U.S. Patents 2,456,408, 2,493,486, and 2,503,726. These compositions, prepared by reacting epichlorohydrin with a dihydric phenol, have structures which consist of alternating aromatic and aliphatic nuclei united through ether oxygens, the aromatic nuclei being the residue of the dihydric phenol and the aliphatic nuclei being a glyceryl residue,

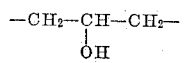

The end groups are either phenolic or epoxy groups depending upon the ratio of the initial reactants. When monofunctional modifiers are used, such as phenol, ethylene chlorohydrin or propylene oxide, these modifiers become the end groups of the polymer. They are not interspersed throughout the polymer chain. In other words, they are not internal modifiers. Compositions that contain internal modification are described in U.S. Patent 3,033,820. These products are prepared by dehydrohalogenating chlorohydrin ethers of hydroxyaliphatic ethers of dihydric phenols.

DESCRIPTION OF THE INVENTION

This invention pertains to an improved process for preparing polyhydroxy-polyether resins containing internal modification. The invention contemplates the homopolymerization of a diether of a dihydric phenol, the two ether substituents being mono(hydroxyaliphatic) and monoglycidyl ether groups. The homopolymerization involves the reaction of a glycidyl ether group of one molecule with a hydroxyaliphatic ether substituent of another molecule. The reaction of epoxide groups with hydroxyl groups results in the formation of another hydroxyl group. As the reaction progresses, the epoxide groups are used up, but the number of hydroxyl groups remains constant. The epoxide groups will react with the hydroxyl groups formed in the reaction as well as the hydroxyl groups initially present. This leads to branching and short-stopping of the polymer chain. Theoretically, when this monoglycidyl, mono(hydroxyaliphatic) diether derivative is polymerized, an infinite molecular weight polymer results. The polymerization, in actuality, does go to an indefinite length, but due to the course of this reaction, the molecular weight tends to stay in a workable range.

The homopolymerization of a monoglycidyl, mono(hydroxyaliphatic) diether of a dihydric phenol is a head-to-tail type polymerization wherein a new ether group and another hydroxyl group are formed.

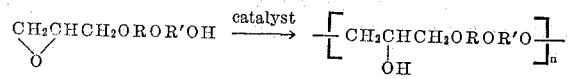

In this equation, R is the aromatic nucleus of a dihydric phenol, wherein the dihydric phenol contains no groups other than phenolic groups which are reactive with epoxy groups or hydroxyl groups, R' is a radical of a simple or substituted aliphatic divalent radical containing at least two carbon atoms selected from the group consisting of aliphatic hydrocarbon groups, aromatic hydrocarbon substituted aliphatic hydrocarbon groups, and hydrocarbon ether substituted aliphatic hydrocarbon groups, and $n$ is an integer greater than one.

The monomeric compositions from which these polyhydroxy-polyether resins are prepared are made by a two-step process involving first preparing the mono(hydroxyaliphatic) ether of a dihydric phenol and then reacting this compound with epichlorohydrin. Such compositions are fully described in application Ser. No. 260,040, filed Feb. 20, 1963.

These mono(hydroxyaliphatic) ethers of dihydric phenols can be readily prepared by reacting one mol of a dihydric phenol with one mol of a simple or substituted aliphatic chlorohydrin using sodium hydroxide as the condensing or dehydrohalogenating agent; or by reacting one mol of a dihydric phenol with one mol of a simple or substituted aliphatic cyclic carbonate using potassium carbonate as the catalyst; or by reacting one mol of a dihydric phenol with one mol of a simple or substituted monoepoxide. These mono(hydroxyaliphatic) ethers of dihydric phenols can be represented by the formula

wherein R and R' have the meanings hereinbefore defined.

Examples of mono(hydroxyaliphatic) ethers of dihydric phenols are the mono(hydroxyethyl) ether of p,p'-dihydroxydiphenyl dimethyl methane (Bisphenol A) in which R is the aromatic residue of Bisphenol A and R' is the —CH$_2$CH$_2$— group, and the mono(hydroxypropyl) ether of resorcinol, wherein R is the aromatic residue of resorcinol and R' is the

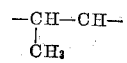

group. These groups are representative of aliphatic hydrocarbon groups.

Other mono(hydroxyaliphatic) ethers are those prepared by reacting one mol of a dihydric phenol with one mol of styrene oxide. Here the hydrocarbon substituted aliphatic hydrocarbon group is

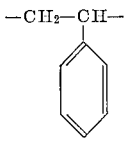

The reaction of phenyl glycidyl ether and a dihydric phenol produces a hydroxy ether substituted aliphatic hydrocarbon group,

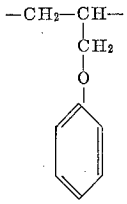

Other simple or substituted hydroxyaliphatic derivatives can be produced by varying the monoepoxide, cyclic carbonate, or chlorohydrin as described in U.S. Patent 3,033,820.

The dihydric phenols used to prepare these mono(hydroxyaliphatic) derivatives are those which have been used heretofore in preparing epoxide resins. Such dihydric phenols include resorcinol, hydroquinone, p,p'-dihydroxydiphenyl dimethyl methane (Bisphenol A), p,p'-dihydroxybenzophenone, dihydroxydiphenyl sulfone, dihydroxy naphthalene and the like.

The diethers used in this invention are prepared by reacting the above described mono(hydroxyaliphatic) ethers of dihydric phenols with excess epichlorohydrin using sodium or potassium hydroxide equivalent to the phenolic hydroxyl content of the starting material. In this reaction, epichlorohydrin reacts with the phenolic hydroxyl group leaving the aliphatic hydroxyl group unreacted. This reaction is illustrated by the following equation in which R and R' have the same meaning as hereinbefore defined:

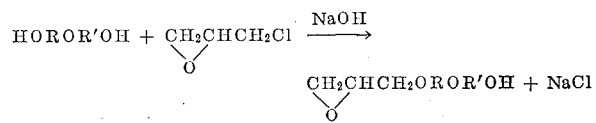

By subjecting such glycidyl ethers to reaction with a condensation catalyst and particularly a $BF_3$ catalyst, such as boron trifluoride ether complex, a polymeric product is formed through the reaction of the epoxide group with the aliphatic hydroxyl group.

The preferred condensation catalysts for this reaction are the Lewis acids. Such catalysts are $BF_3$ and $BF_3$ complexes, such as $BF_3$ ether complex, as well as $AlCl_3$, $SnCl_4$, $TiCl_4$, etc. Other acids such as sulfuric acid, can also be used. The preferred catalyst is $BF_3$, preferably the $BF_3$ etherate.

The polyhydroxy-polyether resins of this invention can be prepared by the bulk homopolymerization of the monoglycidyl, mono(hydroxyaliphatic) diether wherein no solvent is used in the reaction. However, due to the exothermic nature of this polymerization reaction and the high melting resin that is produced, the reaction is preferably conducted in a solvent. Preferred solvents are polar solvents such as ketones, ethers and esters that contain no groups reactive with epoxide groups, such as hydroxyl groups. Such solvents include methyl ethyl ketone, methyl isobutyl ketone, Cellosolve acetate, diethyl Carbitol, and the like. These solvents can also be used in admixture with aromatic hydrocarbons wherein the major portion of the solvent mixture is the polar solvent.

The homopolymerization of the monoglycidyl, mono(hydroxyaliphatic) diether of a dihydric phenol can be conducted at temperatures of 20° C. to 150° C. or even to 200° C. The upper temperature limit will, of course, be governed by the boiling point of the solvent used in the system. The preferred temperature range is 60° C. to 120° C. When temperatures below 60° C. are used, the the rate of reaction is slow, and long processing times are required. When temperatures above 120° C. are used, side reactions occur with resulting darkening of the reaction product.

It is understood that while homopolymerization of the monoglycidyl, mono(hydroxyaliphatic) diether of the dihydric phenol is contemplated, the molecules of diether employed need not necessarily be the same. Thus, either the aliphatic portion or the aromatic portion (R' or R) may be different.

This invention will, perhaps, be best understood by reference to the following examples. These examples are for the purpose of illustration only and the invention is not limited thereto. In these examples, "parts" is understood to be "parts by weight."

Example 1

To a suitable reactor equipped with a stirrer, condenser and thermometer are added 1368 parts of Bisphenol A, 552 parts of ethylene carbonate and 12 parts of potassium carbonate. Heat is applied and stirring is begun. Carbon dioxide begins to evolve from the reactants at a temperature of 158° C. The temperature is gradually raised to 200° C. over a half-hour period and is held at 200° C. for one and one-half hours, at which time no further reaction is occurring as evidenced by no evolution of carbon dioxide. The product is essentially the mono(hydroxyethyl) ether of Bisphenol A.

To 1635 parts of the mono(hydroxyethyl) ether of Bisphenol A are added 3000 parts of epichlorohydrin. When solution is obtained and at 70° C., 246 parts of sodium hydroxide are added in six equal increments, allowing each portion to react completely between additions. After all the sodium hydroxide has reacted, the reactor is fitted for distillation. Eipchlorohydrin is distilled off to a pot temperature of 150° C. Vacuum (20 to 25 mm. Hg pressure) is applied to ensure complete removal of the unreacted epichlorohydrin. The flask contents are cooled to 120° C. and 1000 parts of methyl isobutyl ketone are added. When solution is obtained, 1000 parts of water are added. After slowly stirring for ten minutes, agitation is stopped and the organic and aqueous layers are allowed to separate. The water layer, containing dissolved salt, is drawn off and 1000 parts of fresh water are added. To the reactor are added 40 parts of sodium hydroxide and the reactor contents are heated to reflux (93° C. to 94° C.) and are held at reflux for one hour. The water layer is then drawn off and 1000 parts of fresh water are added. The mixture is neutralized with 30 percent phosphoric acid, and the water layer is drawn off. The remaining water is removed by azeotropic distillation with the methyl isobutyl ketone. When all the water is removed, the solution is filtered and the solvents are removed by vacuum distillation (20 to 25 mm. Hg pressure) to a pot temperature of 150° C. The resulting monoglycidyl, mono(hydroxyethyl) diether of Bisphenol A has an epoxide equivalent weight of 359 and an active chlorine content of 0.04 percent.

To a one-liter flask equipped with thermometer, stirrer, condenser and dropping funnel are added 55 parts of methyl isobutyl ketone and 2 parts of $BF_3$ etherate. 110 parts of the monoglycidyl, mono(hydroxyethyl) diether of Bisphenol A, in 55 parts of methyl isobutyl ketone, are added to the solvent and catalyst over a period of one and one-half hours allowing the temperature to rise from room temperature to 59° C. from the exothermic heat of reaction followed by heating to 80° C. The $BF_3$ catalyst is removed by heating the polymer solution at 80° C. for one hour with 20 parts of cation exchange resin and filtering. The polymer solution has a Gardner-Holdt viscosity of C at 50 percent solids in methyl isobutyl ketone. The resin after removal of solvent has a Durran's melting point of 75° C.

*Example 2*

This example is conducted using the same procedure and ingredients as above except the solvent is made up of 75 percent methyl isobutyl ketone and 25 percent xylene. The resin solution in the mixed solvent has a Gardner-Holdt viscosity of I–J at 50 percent solids. The resin has a melting point of 78° C.

*Example 3*

Using the same procedure and ingredients as in Example 1, except for the solvent which is diethyl Carbitol, a resin solution is prepared with a viscosity of E–F at 50 percent solids.

*Example 4*

To a suitable reactor equipped as described in Example 1 are added 228 parts of Bisphenol A and 150 parts of methyl isobutyl ketone. Heat and stirring are applied to dissolve the Bisphenol A in the solvent. At a temperature of 75° C., two parts of potassium carbonate are added to the flask. The slow dropwise addition of propylene oxide is begun at 80° C. Sixty-five parts of propylene oxide are added over a two-hour period while holding the temperature between 80° C. and 90° C. Heating is continued to hold a gentle reflux in the flask and to allow the temperature to slowly rise to 118° C. The solvent is removed by distillation under water aspirator vacuum to a pot temperature of 160° C. This product, the mono(hydroxypropyl) ether of Bisphenol A, is then reacted with epichlorohydrin as described in Example 1 to form the monoglycidyl, mono(hydroxypropyl) diether of Bisphenol A.

To a one-liter flask equipped as in Example 1 is added 50 parts of methyl isobutyl ketone and 1 part of $BF_3$ etherate. 100 parts of the monoglycidyl, mono(hydroxypropyl) diether of Bisphenol A in 50 parts of methyl isobutyl ketone are added slowly from the dropping funnel over a half-hour period, the temperature rising from room temperature to 52° C. from the exothermic reaction. Heat is then applied to raise the temperature to 80° C. The $BF_3$ catalyst is removed by heating with 10 parts of cation exchange resin and filtering. The viscosity of the resulting resin solution is $A_2$ at 50 percent solids.

*Example 5*

The resin solutions of Examples 1 through 4 are blended with 20 percent, 25 percent and 30 percent on solids basis of a 60 percent solution of a butylated urea-formaldehyde resin. The morpholine salt of tertiary butyl phosphate (0.5 percent by weight based on solids content) is added to each blend as catalyst and 3 mil films are prepared on glass and baked thirty minutes at 150° C. Well cured, tough films with excellent adhesion are obtained.

*Example 6*

The resin solution of Example 4 is blended with polyisocyanates on an equal hydroxyl-isocyanate ratio. The isocyanates used are the adduct of 3 mols of tolylene diisocyanate and 1 mol of trimethylol propane and the same adduct blocked with 3 mols of phenol. Three mil films of these blends are heated for thirty minutes at 180° C., yielding well cured films with excellent adhesion and flexibility.

*Example 7*

The monoglycidyl, mono(hydroxyethyl) diether of resorcinol used in this example is prepared by reacting one mol of resorcinol with one mol of ethylene carbonate followed by reaction in excess epichlorohydrin using the procedure described in Example 1.

To a 500-milliliter flask equipped as in Example 1 are added 27 parts of diethyl Carbitol and 0.45 part of $BF_3$ etherate. Heat is applied to raise the temperature to 65° C. At 65° C., the solution of 45 parts of the monoglycidyl, mono(hydroxyethyl) diether in 18 parts of diethyl Carbitol is added over a one-hour period holding the temperature between 60° C. and 70° C. The temperature is raised to 100° C. and held at 100° C. for one hour. The catalyst is removed by treatment with 4.5 parts of cation exchange resin and filtering.

Films (3 mil on glass) prepared from this resin solution with 30 percent and 40 percent on a solids basis of butylated urea-formaldehyde resin, 0.1 percent morpholine salt of butyl acid phosphate, and baked for thirty minutes at 150° C. have excellent mar resistance, flexibility, hardness, toughness, and adhesion properties.

The products which result from the homopolymerization process of this invention are essentially high molecular weight polyhydric alcohols. These products are valuable compositions due to the presence of the hydroxyl groups which are reactive with many materials. Such materials are anhydrides, such as phthalic anhydride or maleic anhydride, or acids such as lauric or palmitic. Particularly valuable products are obtained by reacting these high molecular weight polyhydric alcohols with unsaturated acids derived from drying oils. Such esterified products are useful in preparing air-drying and baking varnishes and enamels for use as protective coatings for wood, metal and other substances. Protective coatings are also prepared by reacting these polymeric polyhydric alcohols with cross-linking agents as hereinbefore described. These cross-linking agents can be polyisocyanates, such as tolylene diisocyanate, hexamethylene diisocyanate, diphenyl methane diisocyanate, etc., which are used in the range of 0.5 to 1.2 isocyanate groups per 1 hydroxyl group; condensation products containing methylol groups and obtained from the reaction of formaldehyde with urea, melamine, benzoguanamine and phenol, which are used to make up 15 percent to 50 percent of the composition with the polyhydroxy compound; and compositions which contain methylol groups and alkoxy-methylol groups which are obtained from the reaction of formaldehyde with urea, melamine, acetoguanamine, phenol and the like, along with an alcohol, such as methanol, isopropanol, butanol and the like. Polyepoxides, such as the diglycidyl ether of Bisphenol A and dicyclopentadiene dioxide, can also be used to cross-link the polyhydroxy-polyether resins of this invention.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for producing high molecular weight fusible, soluble polyhydroxy-polyether resins which comprises subjecting monoglycidyl, mono(hydroxyaliphatic)diethers of dihydric phenols having the following general formula

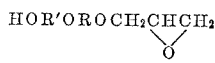

in which R is the aromatic residue of a dihydric phenol and R' is a divalent radical containing at least two carbon atoms selected from the group consisting of saturated aliphatic hydrocarbon groups, aromatic hydrocarbon substituted aliphatic hydrocarbon groups and hydrocarbon ether substituted aliphatic hydrocarbon groups, to homopolymerization with a catalyst selected from the group consisting of boron trifluoride, boron trifluoride complexes, aluminum chloride, stannic chloride, titanium chloride and sulfuric acid.

2. The process of claim 1 wherein the monoglycidyl, mono(hydroxyaliphatic)diether of the dihydric phenol is the monoglycidyl, mono(hydroxyethyl)diether of p,p'-dihydroxy diphenyl dimethyl methane and the catalyst is a boron trifluoride catalyst.

3. The process of claim 1 wherein the monoglycidyl, mono(hydroxyaliphatic)diether of the dihydric phenol is the monoglycidyl, mono(hydroxyethyl)diether of resorcinol and the catalyst is a boron trifluoride catalyst.

4. The process of claim 1 wherein the homopolymerization is conducted in a solvent, the major portion of which is selected from at least one member of the group consisting of ketones, ethers and esters, each being free of active hydrogen groups reactive with epoxide groups.

5. The process of claim 4 wherein the solvent is methyl isobutyl ketone.

References Cited
UNITED STATES PATENTS

| | | | |
|---|---|---|---|
| 2,464,753 | 3/1949 | Shokal et al. | 260—47 |
| 3,033,820 | 5/1962 | Price et al. | 260—47 |

MURRAY TILLMAN, *Primary Examiner.*

J. C. BLEUTGE, *Assistant Examiner.*